July 19, 1949.  E. E. FOSTER  2,476,363
PRESSURE APPLYING MECHANISM FOR
PRESSING AND IRONING MACHINES
Filed Feb. 17, 1941  18 Sheets-Sheet 7
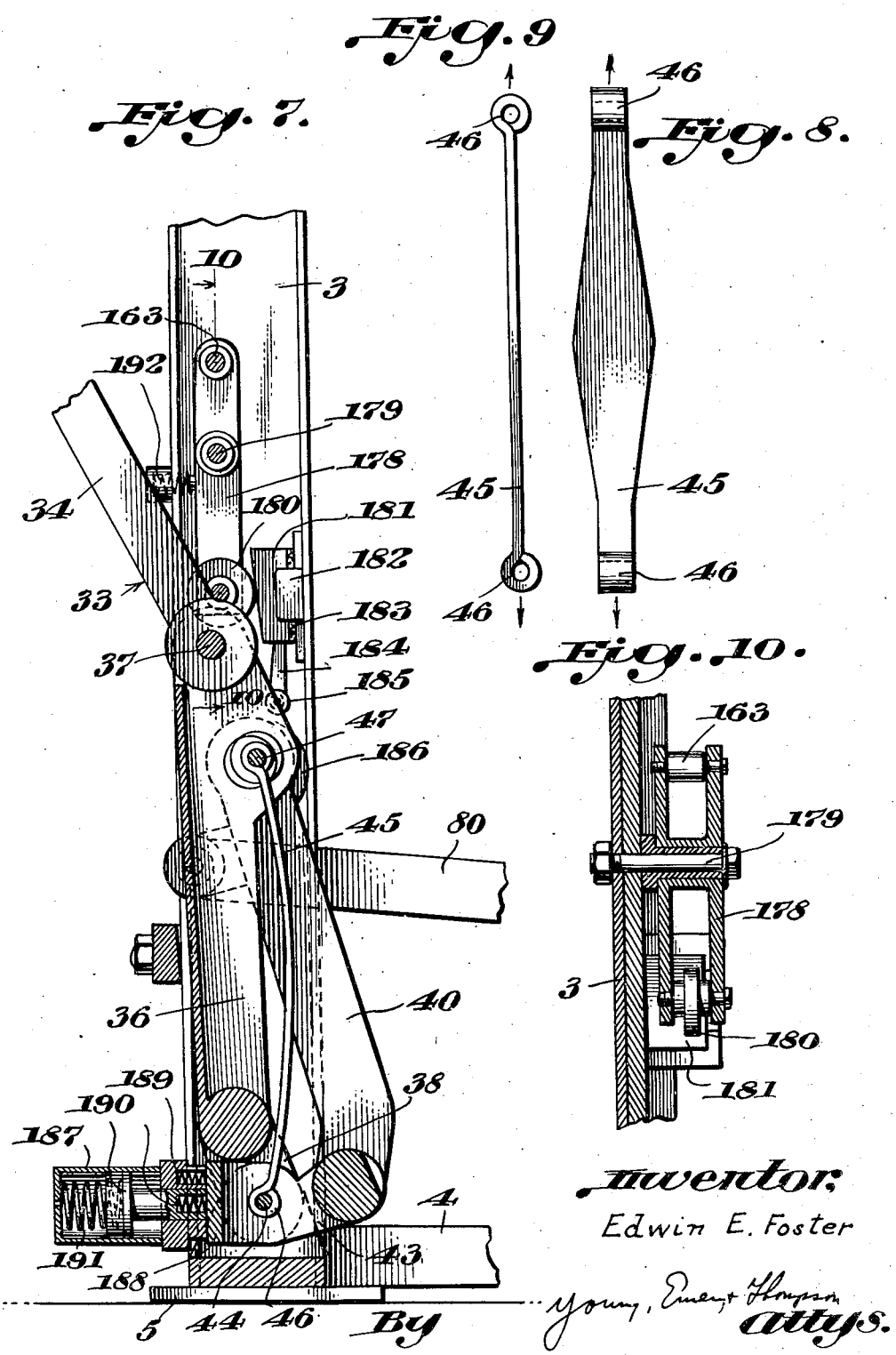
Inventor,
Edwin E. Foster
By Young, Emery & Thompson
attys.

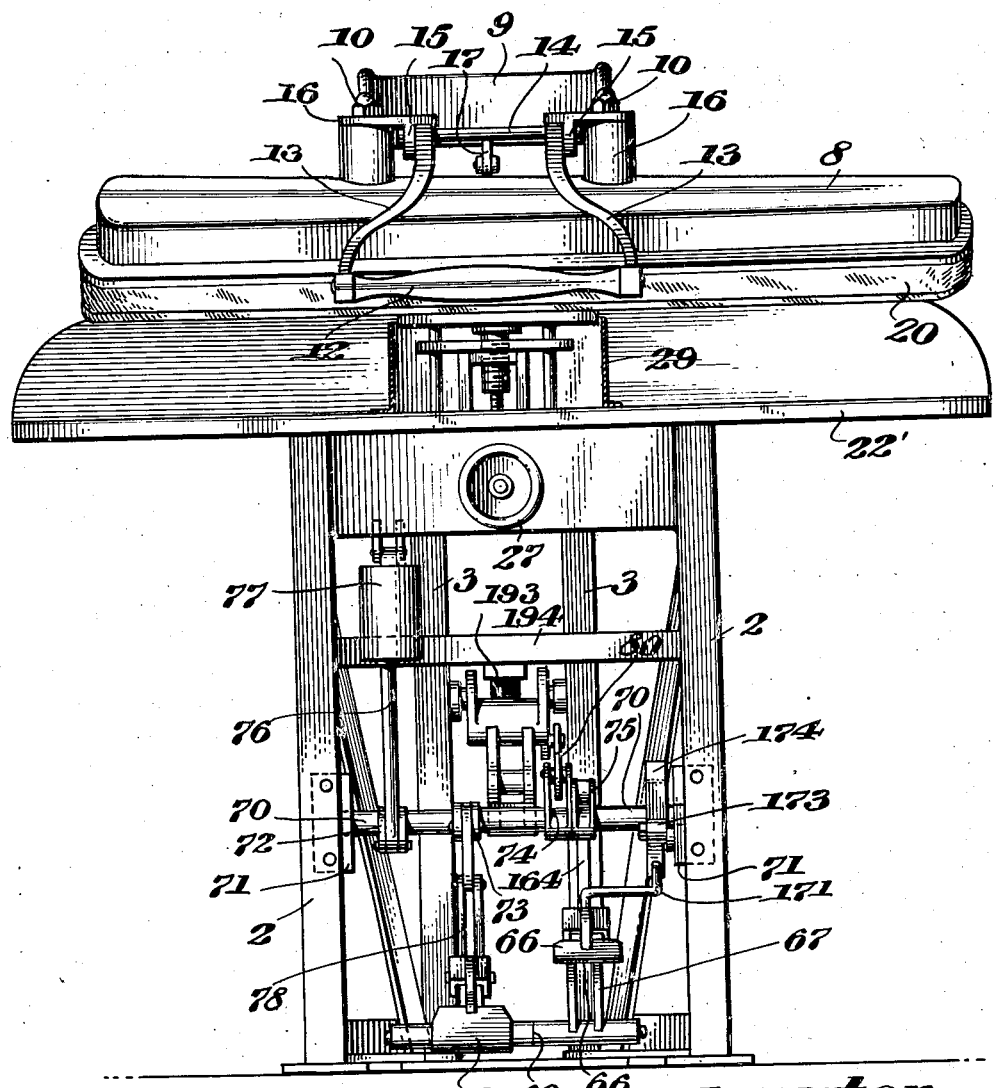

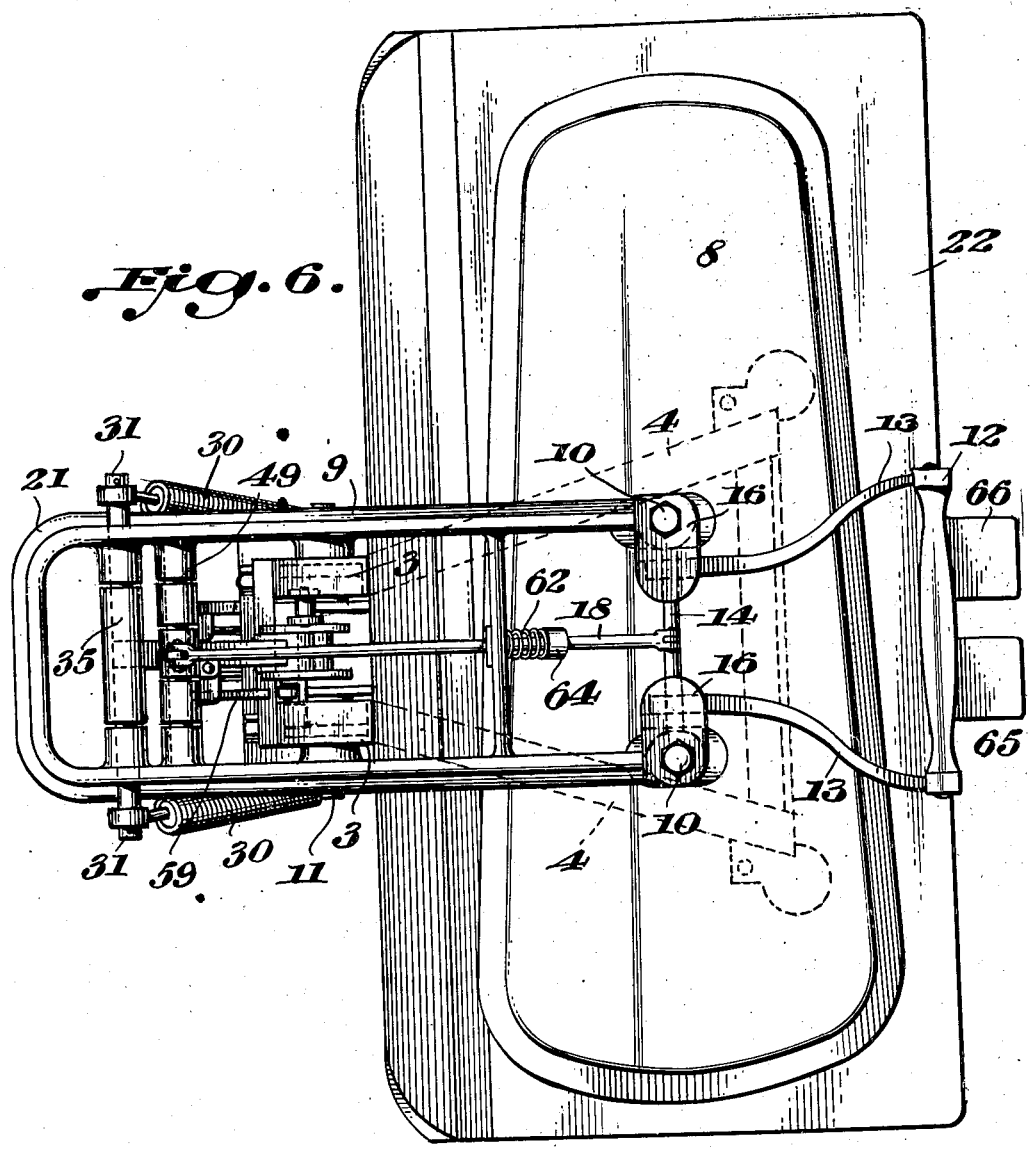

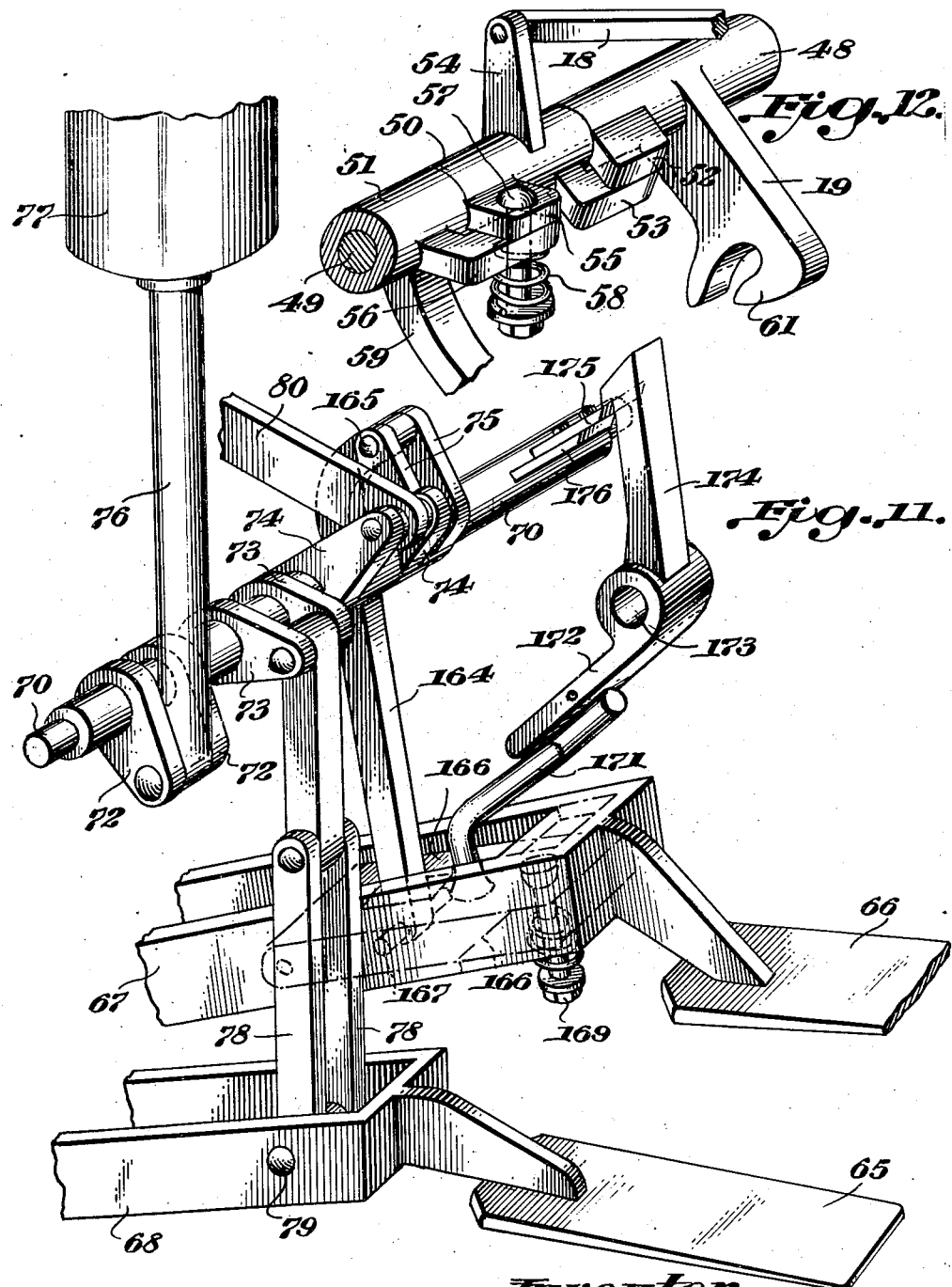

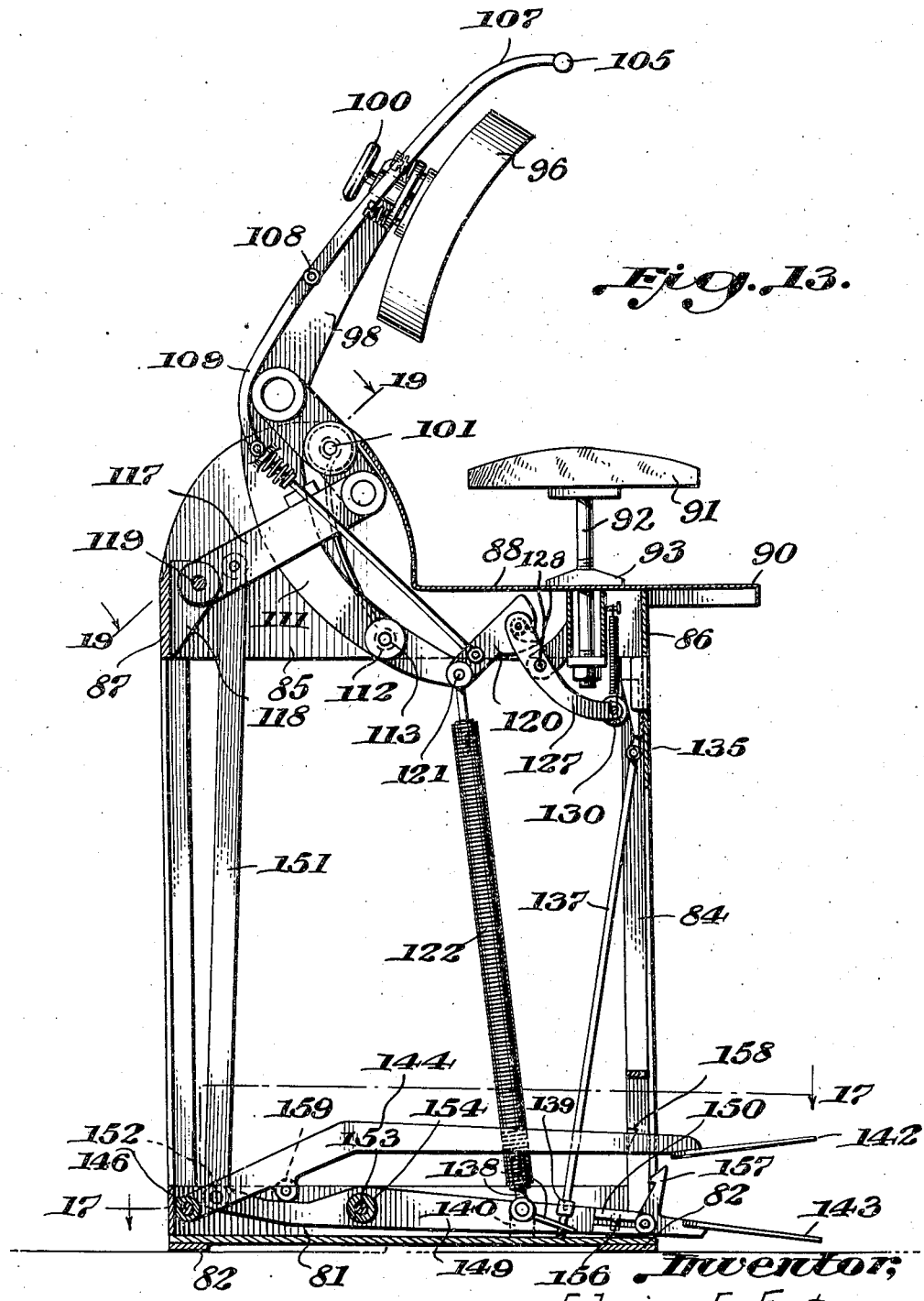

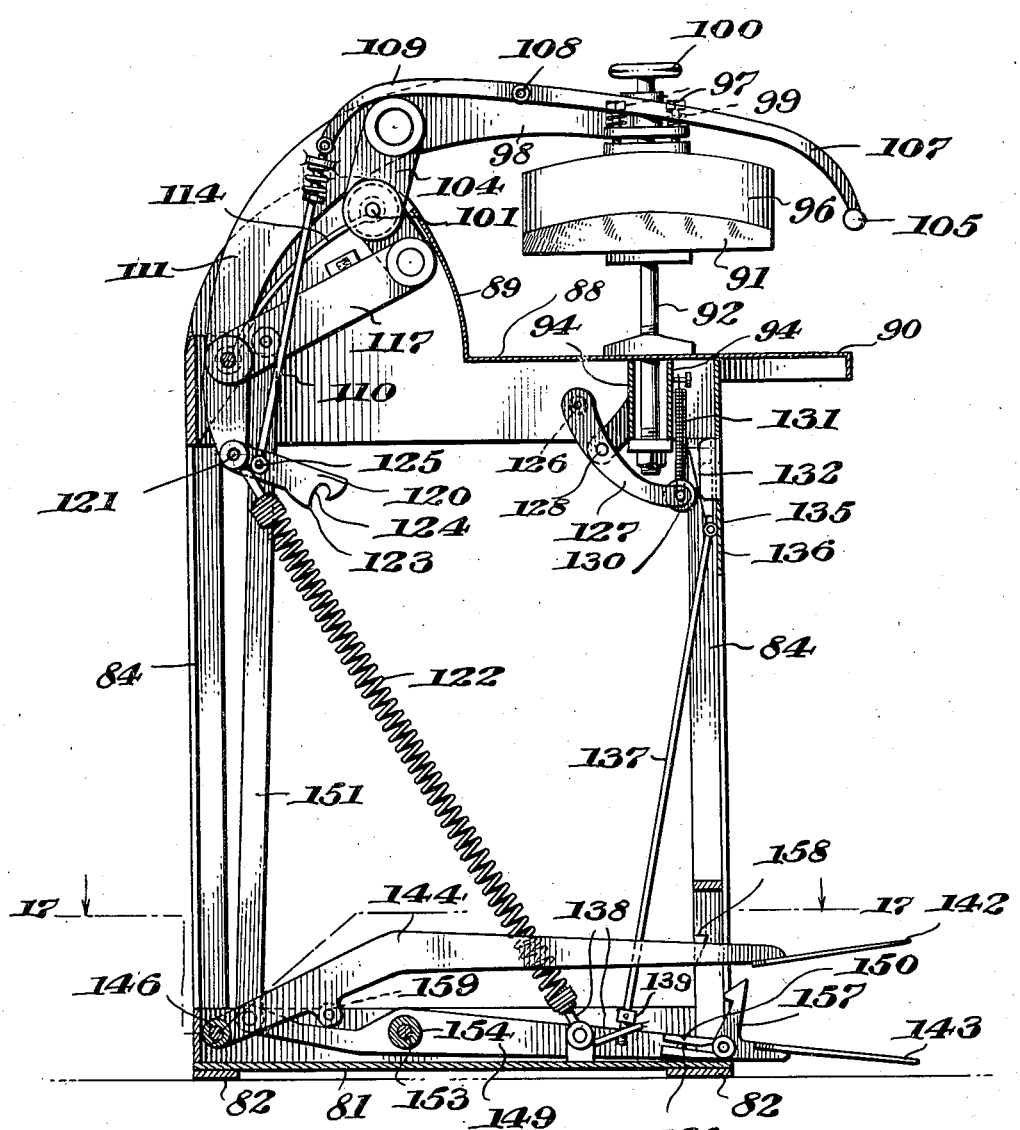

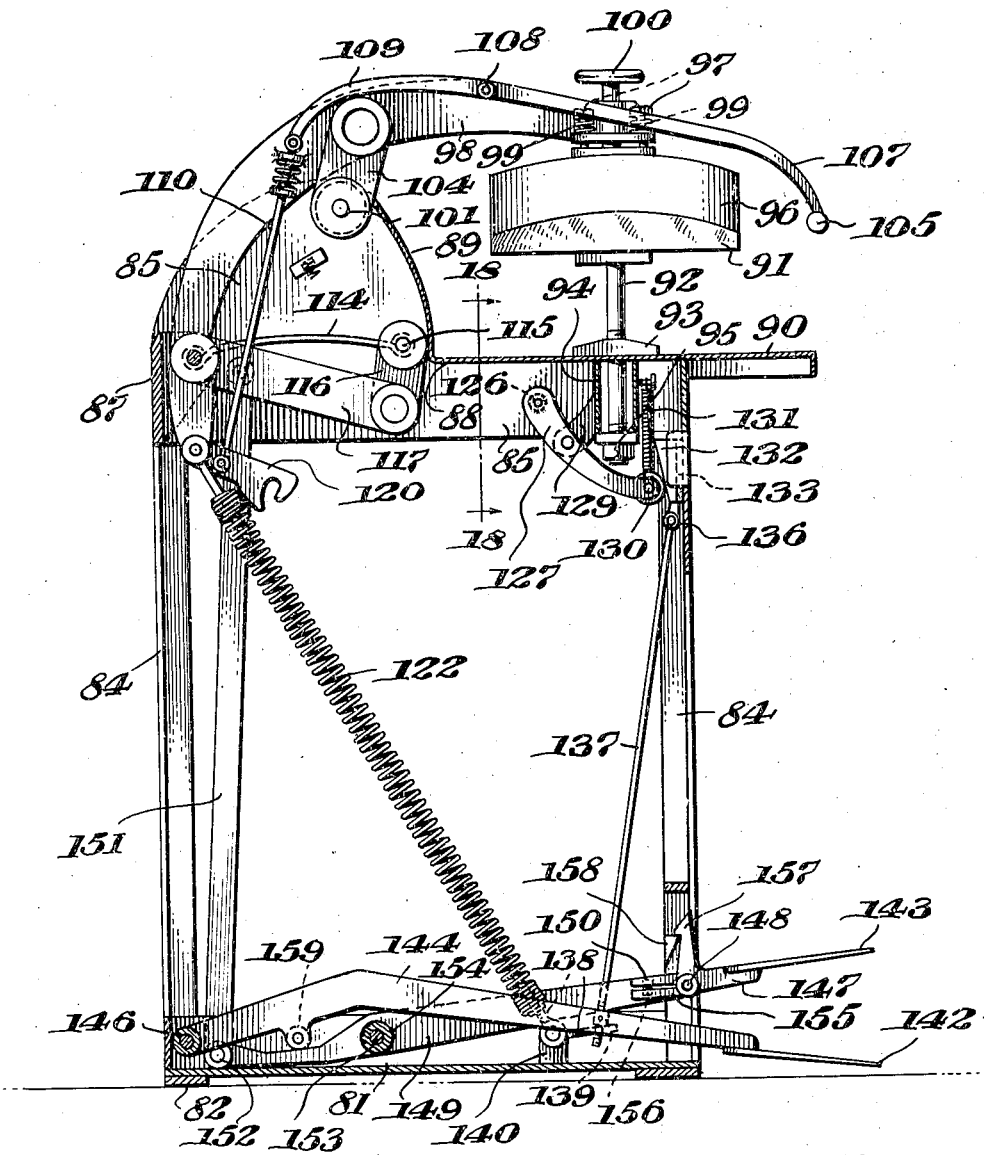

July 19, 1949.  E. E. FOSTER  2,476,363
PRESSURE APPLYING MECHANISM FOR
PRESSING AND IRONING MACHINES
Filed Feb. 17, 1941  18 Sheets-Sheet 12
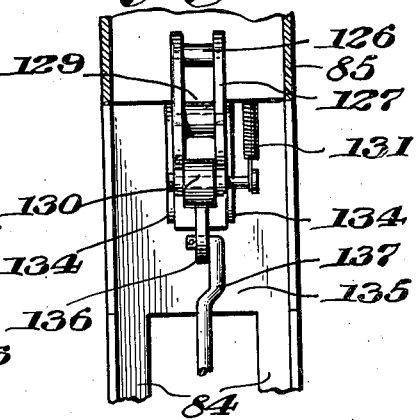
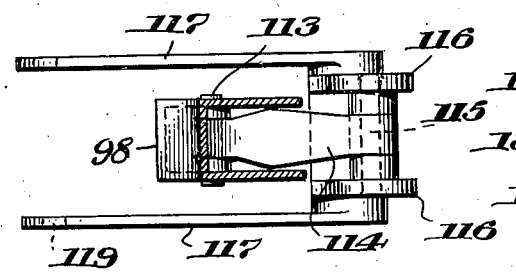
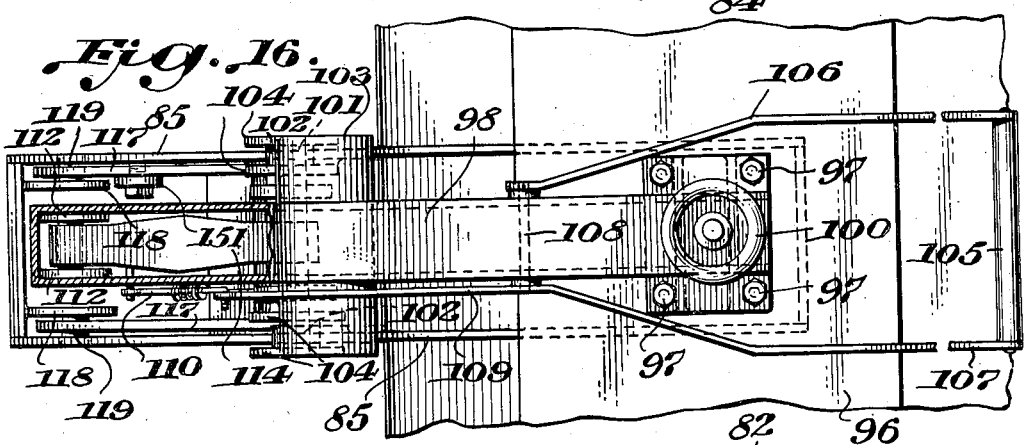
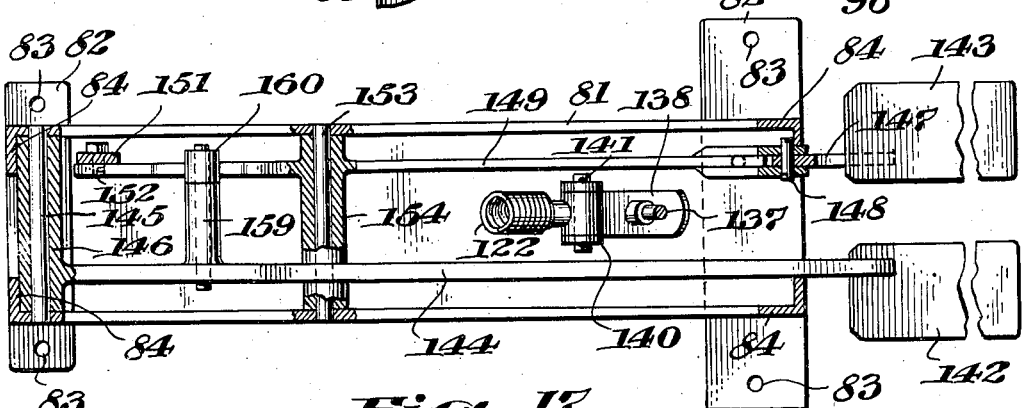
Inventor;
Edwin E. Foster
By Young, Emery & Thompson
Attys.

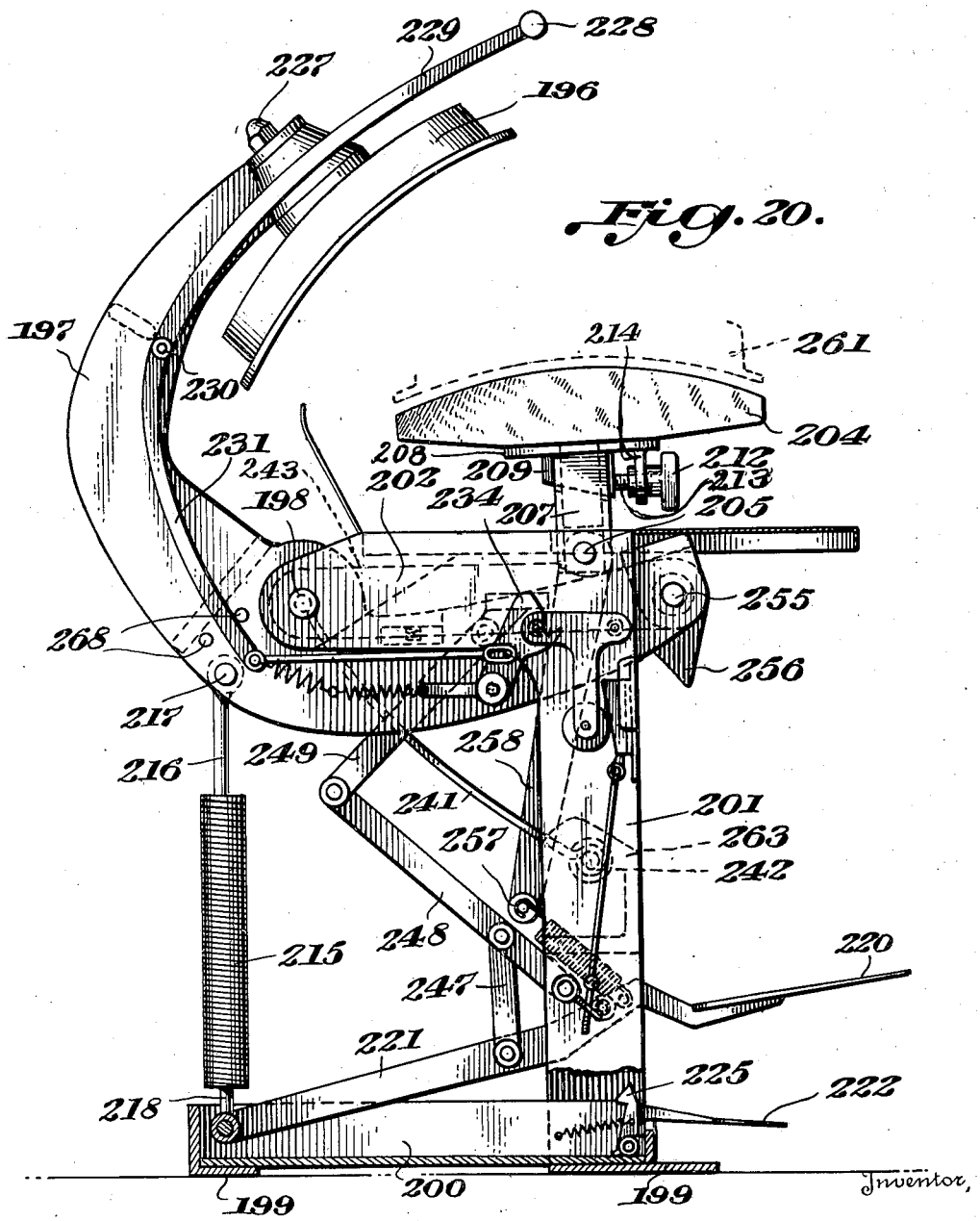

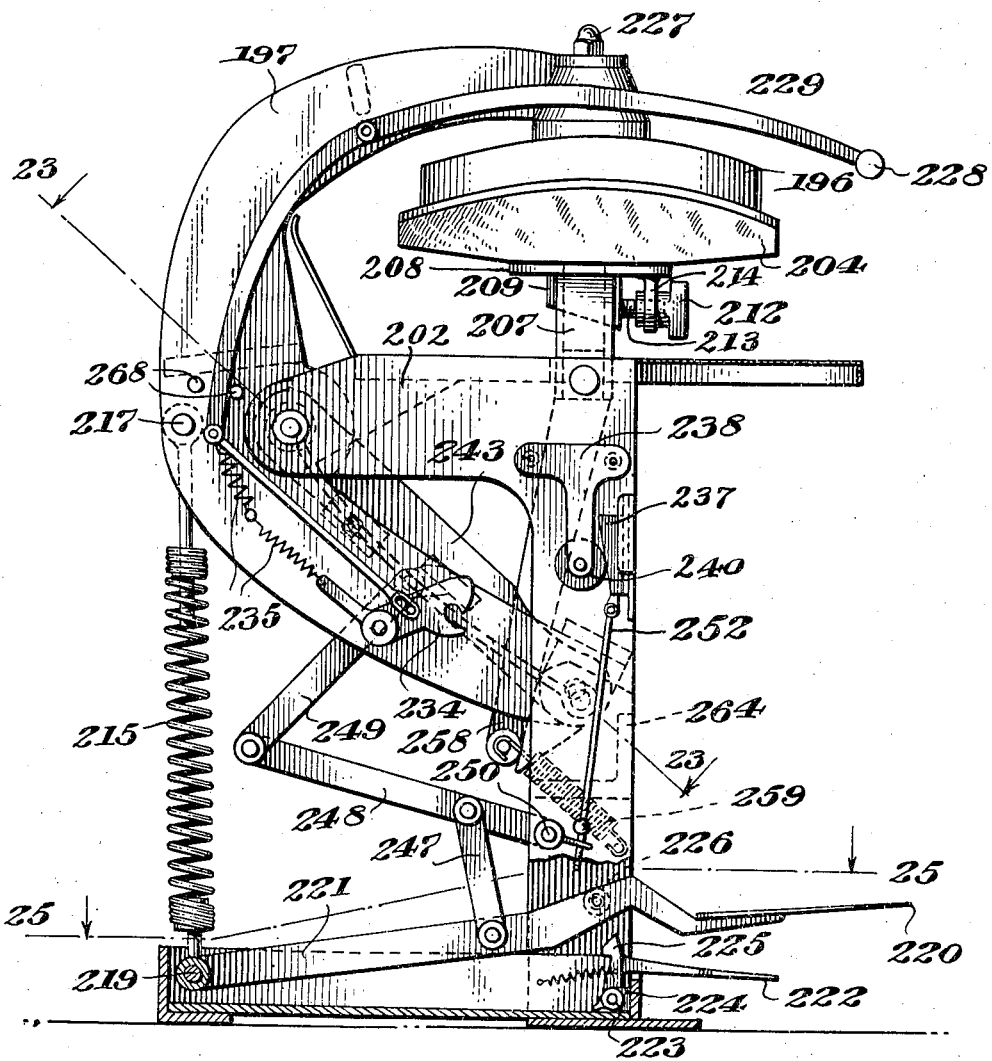

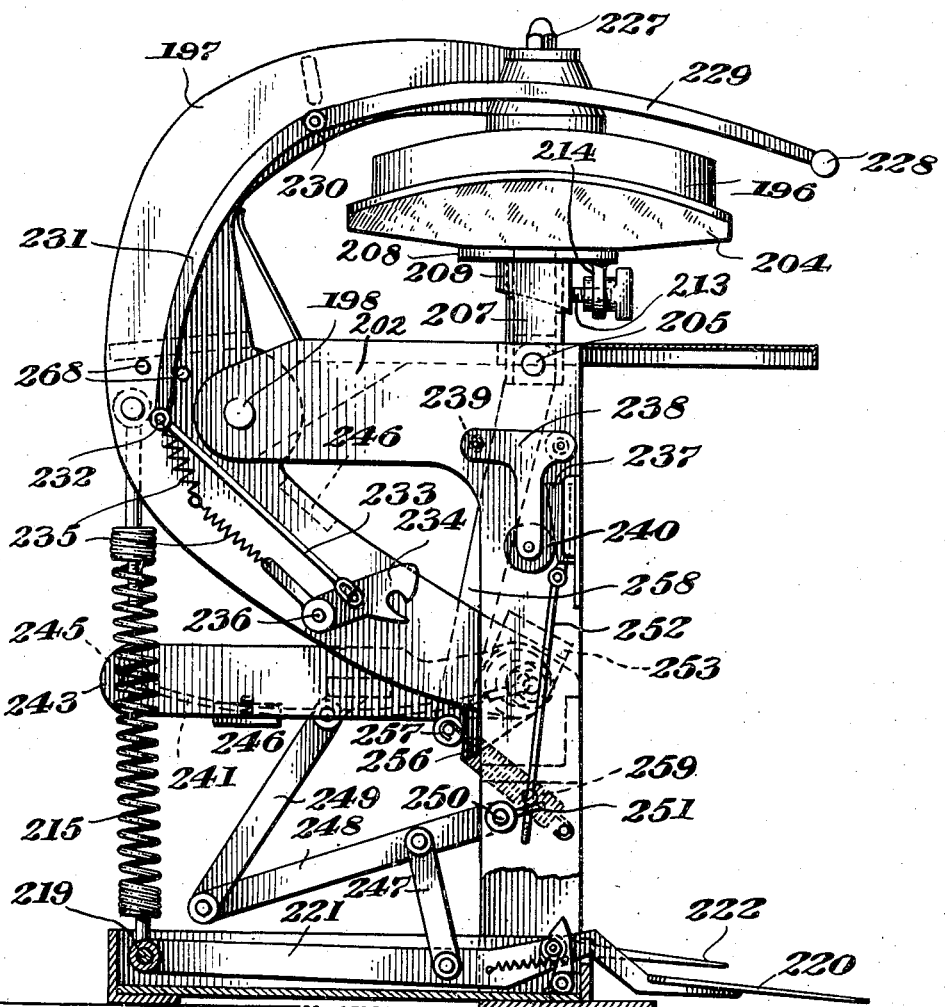

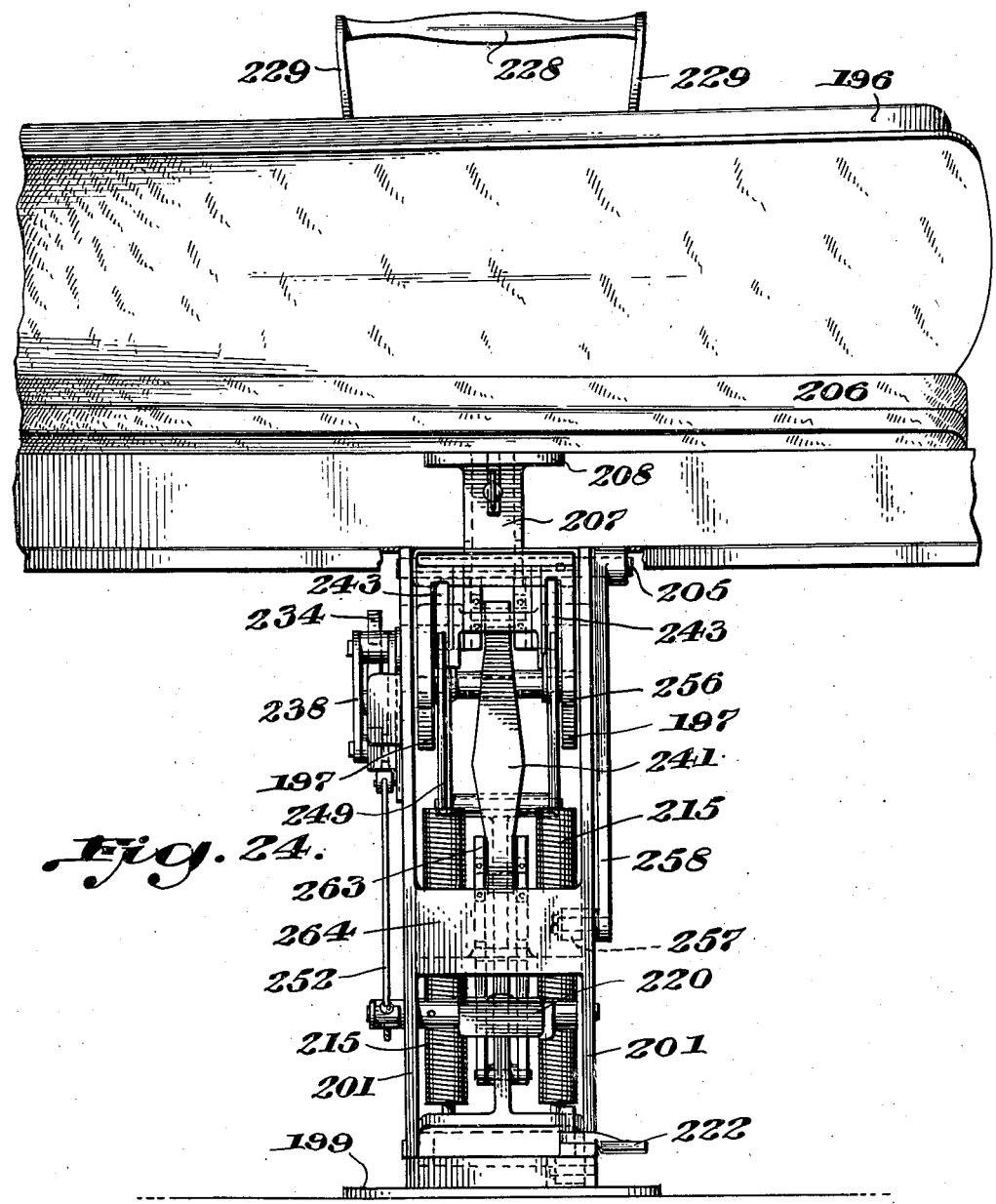

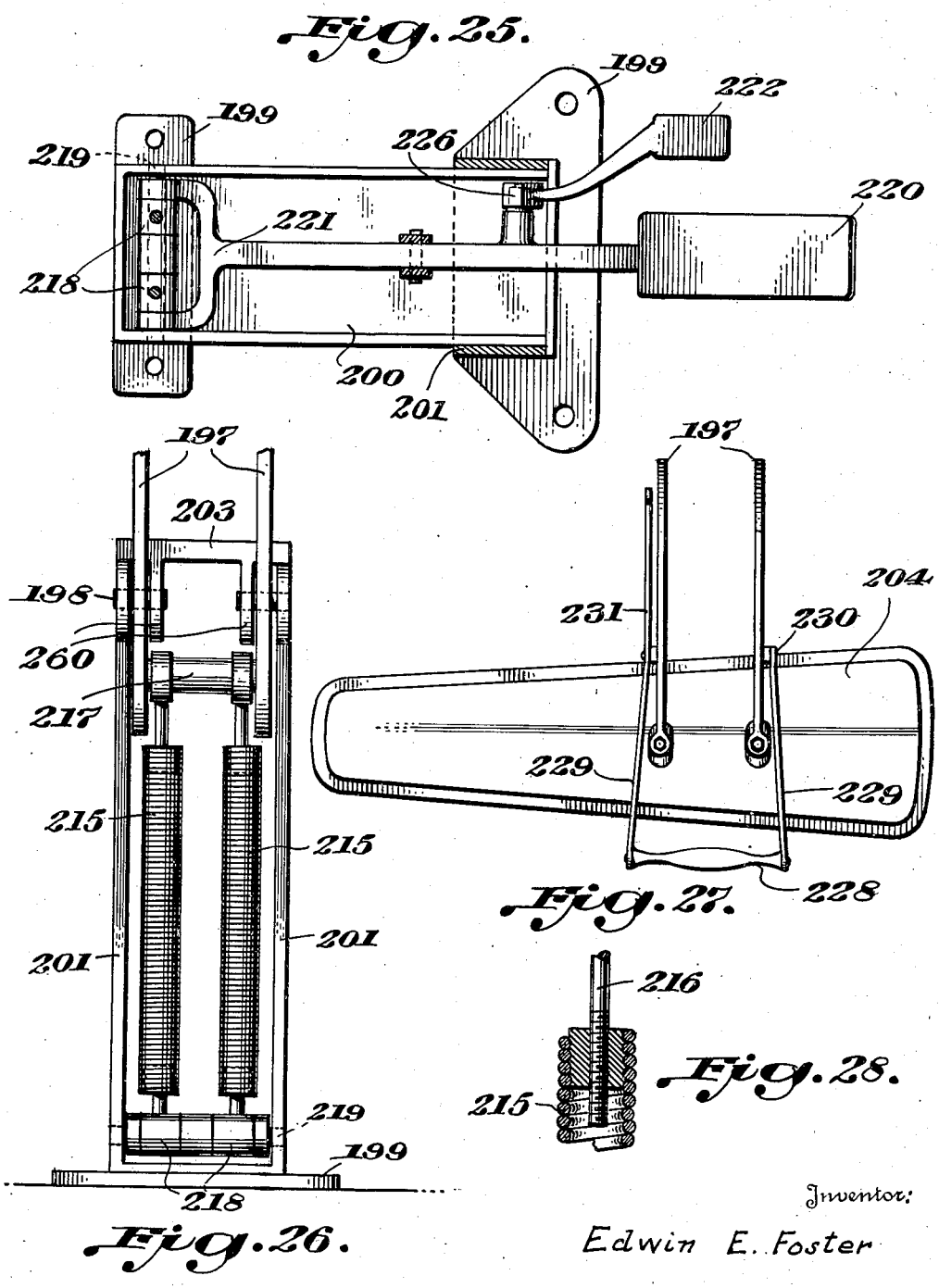

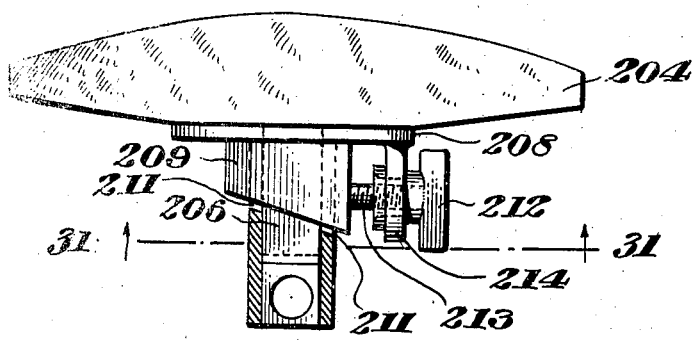
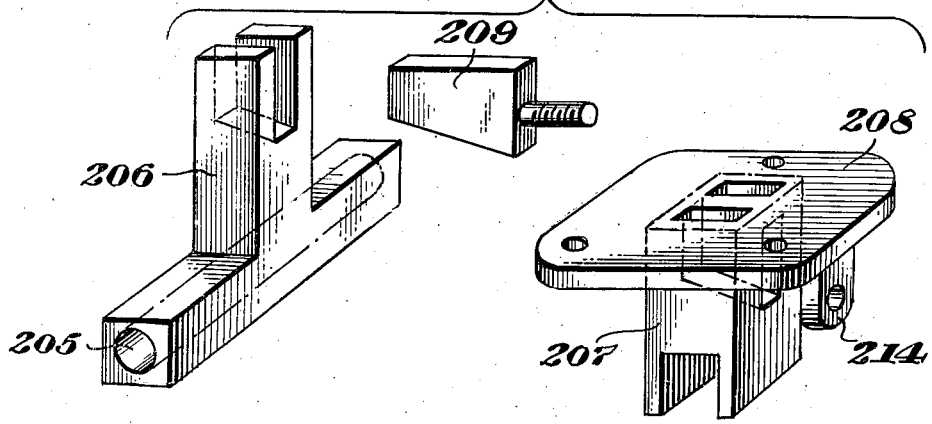
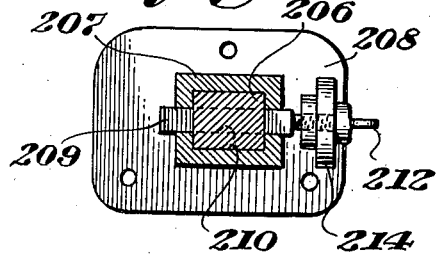
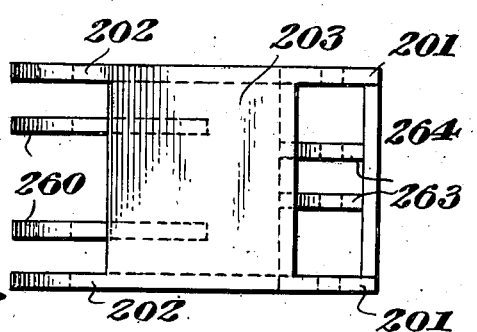

Patented July 19, 1949

2,476,363

UNITED STATES PATENT OFFICE 2,476,363

PRESSURE APPLYING MECHANISM FOR PRESSING AND IRONING MACHINES

Edwin E. Foster, Austin, Tex.

Application February 17, 1941, Serial No. 379,317

6 Claims. (Cl. 38—36)

The present invention relates to a pressing machine which is adapted to be used generally where it is desired to apply a pressure or force for a certain period of time. More specifically the invention is particularly adapted for pressing and ironing machines for use in laundries, cleaning establishments and anywhere where clothes, linen and all types of fabrics are to be pressed and ironed.

It is an object of this invention to provide a machine, having relatively movable head and bed members to carry out the pressing and ironing of the material, in which the movable member, as for instance the head member, is so mounted and actuated that it will be moved from open to press closed position and from closed to open position in a minimum of time and with little manual effort, even for large presses producing 8000 lbs. or more pressure. In this way it will be possible to speed up the pressing operation in that the head member not only rapidly accelerates in its starting movement but is cushioned in its end positions to build up a certain amount of energy which is utilized in the next following acceleration of the change in position of the head member.

A further object of the invention is to provide a constant force applying means in the form of a slightly bowed compression member having its forces constantly projected in opposite directions from the ends of the member of which each force is directed at an approximately parallel axis to the length of the member. More specifically the constant force applying means is in the form of an elongated band spring which is preferably diamond shaped and projects a constant force throughout its entire flexure. Such a spring also maintains the same pressure between the head and bed members during pressing irrespective of the thickness of the material to be pressed or ironed. The pressure deflection curve of the spring according to this invention starts at its maximum pressure depending upon the size and weight of the leaf band and maintains the maximum pressure irrespective of further flexing. This characteristic of the spring provides an automatic thickness compensation for the materials being pressed.

A still further object of the invention resides in providing latching means to automatically latch the movable head member in the open position with a certain amount of built up energy in the machine to start the head member down with quick acceleration upon the release of the latch. A further object of the invention is to provide a foot actuated press in which the ironing force or pressure of from 500 to 8000 lbs. is applied by a foot pedal requiring an actuating force of from 5 to 30 lbs. of manual effort through a pedal stroke of from 2 to 5 inches. The ironing force or pressure of from 500 to 8000 lbs. is derived from the constantly-stored energy unit in which the force or pressure thereof is maintained throughout the use and life of the machine without at any time releasing the energy from the machine which energy was originally built up at the time the machine was constructed and assembled.

Further objects will be apparent from the following description taken in connection with the accompanying drawings in which;

Figure 1 is a side elevation of a pressing machine with the parts in open position, Fig. 2 is a side elevation of the machine of Fig. 1 with the parts in press closed position but without the application of pressure, Fig. 3 is a side elevation of the machine of Fig. 1 with the parts in press closed position with pressure applied, Fig. 4 is a rear elevation of the machine of Fig. 3, Fig. 5 is a front elevation of the machine, Fig. 6 is a plan view of the machine in press closed position, Fig. 7 is a vertical sectional view taken on line 7—7 of Fig. 4 in the direction of the arrows, on an enlarged scale but showing the parts in position without the pressure applied, as in Fig. 2.

Fig. 8 is a detail plan view of the spring,

Fig. 9 is a detail side view of the spring,

Figure 1:
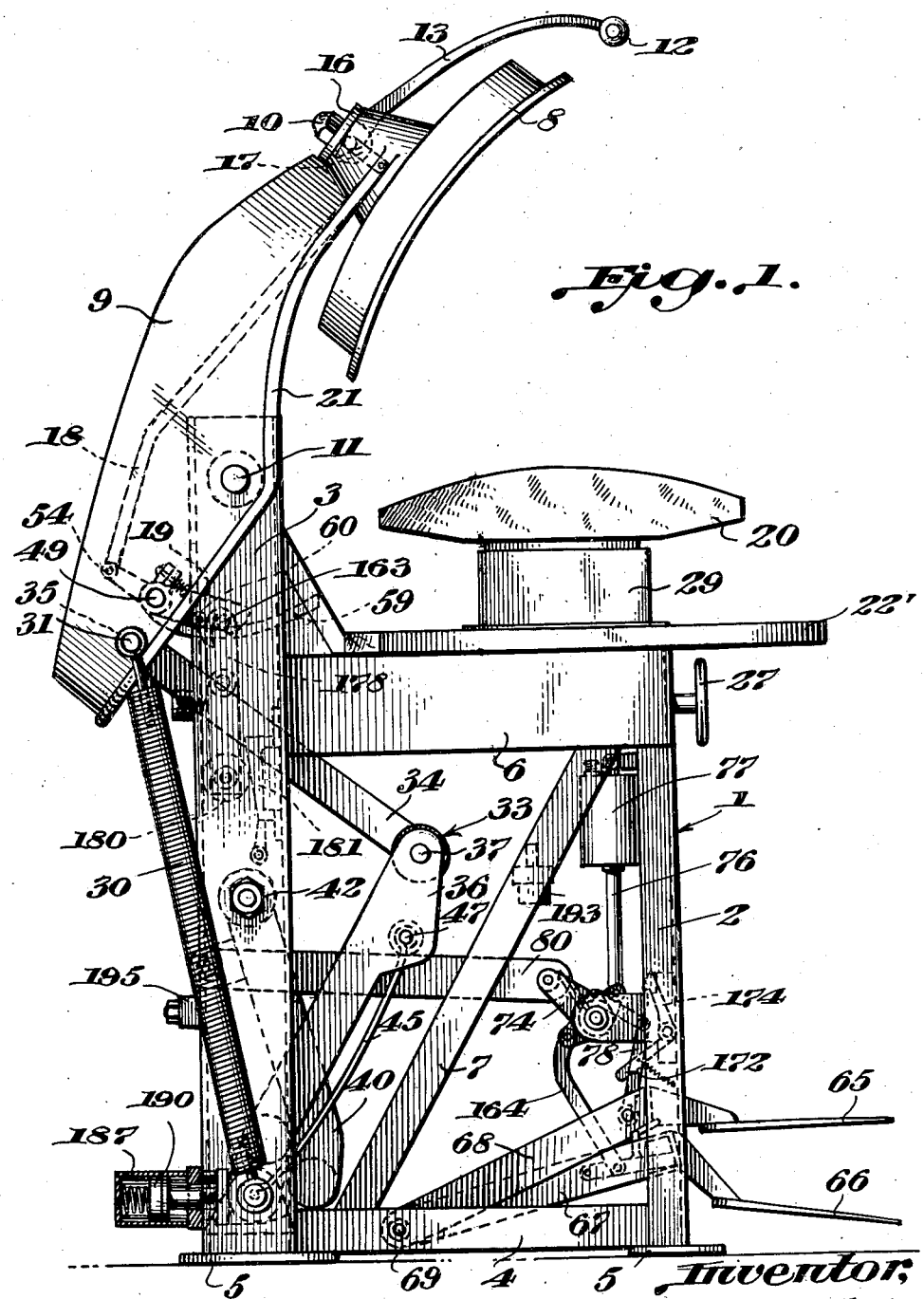

Fig. 10 is a sectional view of a detail taken on line 10—10 of Fig. 7 in the direction of the arrows, Fig. 11 is a perspective view of a portion of the pedals and their operating connections, Fig. 11a is a sectional view of a detail, Fig. 12 is a perspective view of the latch mechanism, Fig. 13 is a side elevation partly in section of a modified pressing machine showing the parts in open press position, Fig. 14 is a side elevation partly in section of the press of Fig. 13 with the parts in closed press position but before pressure is applied, Fig. 15 is a side elevation partly in section of the press of Fig. 13 with the parts in closed press position with pressure applied, Fig. 16 is a top plan view of Fig. 14 partly in section, Fig. 17 is a sectional view taken on line 17—17 of Fig. 14 in the direction of the arrows, Fig. 18 is a detail sectional view taken on line 18—18 of Fig. 15 in the direction of the arrows, Fig. 19 is a detail sectional view taken on line 19—19 of Fig. 13 in the direction of the arrows, Fig. 20 is a side elevation of a further modified construction, partly in section and showing the parts in press open position, Fig. 21 is a side elevation of the machine of Fig. 20 with the parts in press closed position before the application of pressure, Fig. 22 is a side elevation of the machine of Fig. 20 with the parts in press closed position with pressure applied, Fig. 23 is a cross sectional view taken on line 23—23 of Fig. 21 in the direction of the arrows, Fig. 24 is a front view of the machine of Figs. 20 to 22, Fig. 25 is cross sectional view taken on line 25—25 of Fig. 21.

Fig. 26 is a rear view of the frame and counterbalance springs of the machine of Figs. 20 to 22, Fig. 27 is a top plan view of the head member and yoke of the machine of Figs. 20 to 22, Fig. 28 is a sectional view showing a counterbalance spring connection, Fig. 29 is a side elevation partly in section of the bed member and its support of the machine of Figs. 20 to 22, Fig. 30 is a top plan view of the frame of the machine of Figs. 20 to 22, Fig. 31 is a cross section taken on line 31—31 of Fig. 29 in the direction of the arrows, and Fig. 32 is an exploded perspective view of the adjustable mounting details for the bed member.

The pressing machine according to Figs. 1 to 12 is provided with a suitable frame 1 composed of two front upright angle irons 2 and two back or rear channel or U-shaped irons 3 interconnected by side angle irons 4 and plate members 5 by means of which the machine may be bolted down on a floor. The various members of the frame including the upper channel members 6 may be suitably bolted or riveted together or they may be welded to each other. The structure of the frame 1 however, may comprise any suitable and desired struts including cross ties 7 and the outer surfaces of the members may have sheet metal bolted or otherwise secured thereto to protect the working parts of the machine and to prevent the material to be pressed from becoming soiled or damaged by such working parts.

The head member 8 of any desired construction and configuration is rigidly mounted on the arm or yoke 9 by means of bolts 10 passing through the end of the arm. The movable arm 9 is pivoted on a bearing rod or shaft 11 supported in the upper part of the channel members 3 so that the arm 9 thus extends over the upper ends of the members 3. The head member is provided with a handle 12 inter-connecting two levers 13 mounted on and rotating with the shaft 14. This shaft 14 is rotatably mounted in lugs 15 depending from and secured to the plates 16 each projecting laterally from the end of the arm, Fig. 5, toward each other. A depending lever 17 is secured midway between the handle levers 13 and is connected to and actuates a rod 18 which in turn actuates a latch 19, Fig. 12, which will be referred to more in detail. The yoke 9 is preferably formed as shown in Fig. 6 with a reinforcing bead 21 along the lower edge but it may comprise any other form or construction and may be provided with a top plate, not shown, as a cover.

Figure 3:
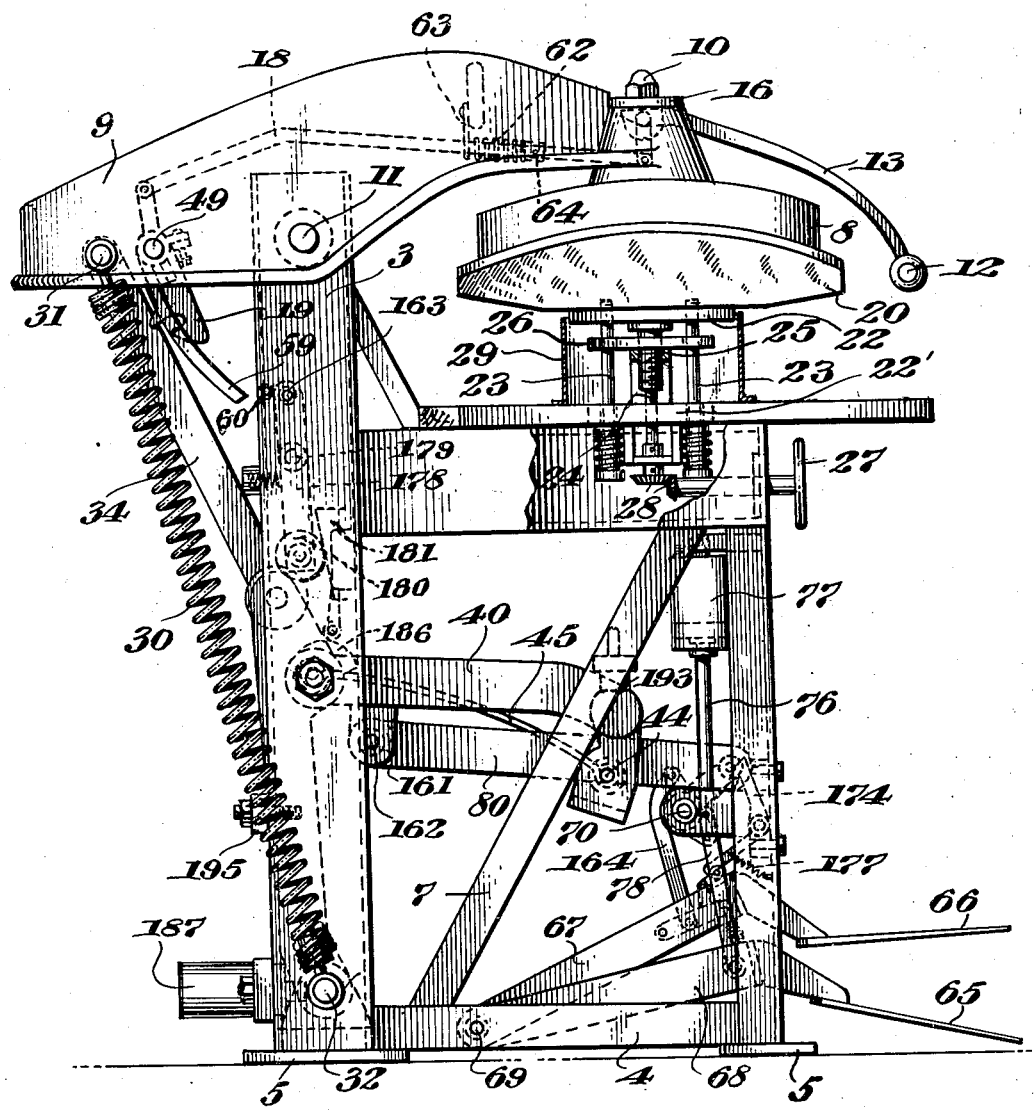

The buck or bed member 20 is adjustably supported on a bridge member 22 by means of a plurality of bolts 23, Fig. 3, and a central shaft 24 threaded in a collar 25 which latter is secured to the plate 26. A hand wheel 27 rotates the shaft 24 by means of bevel gears 28. A cover 29 secured to the table 22' protects the materials to be pressed from contact with the bed support.

Figure 4:
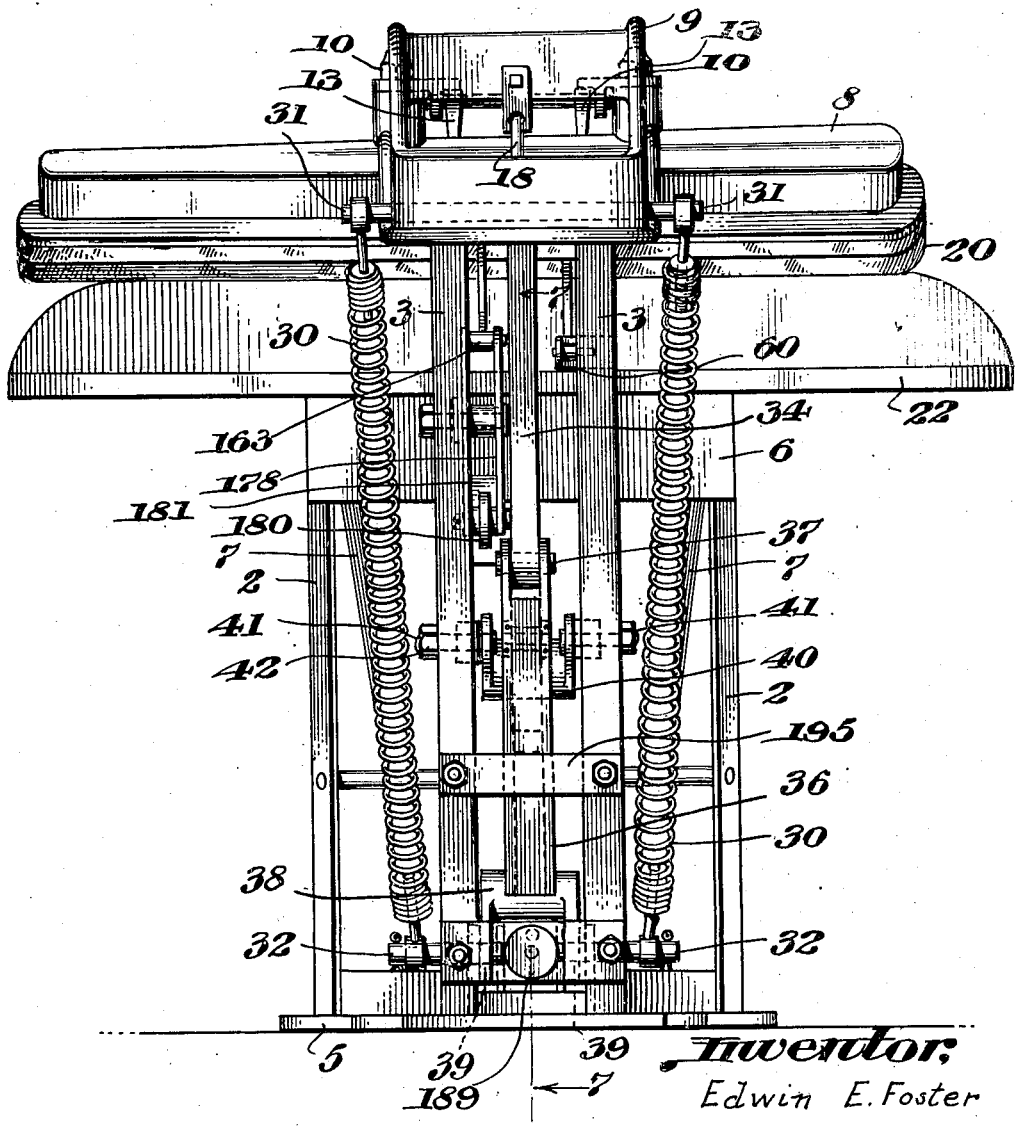

Due to the weight of the entire head member and its yoke, two coiled counter-balance springs 30 are connected each at one end to a shaft 31 in the yoke 9 and the other end to a stub shaft 32 one on each side of the frame, Fig. 4. These springs 30 tend to pull the head member 8 and yoke 9 from the position of Fig. 2 to that of Fig. 1, that is from press closed position without pressure to press open position.

Figure 2:
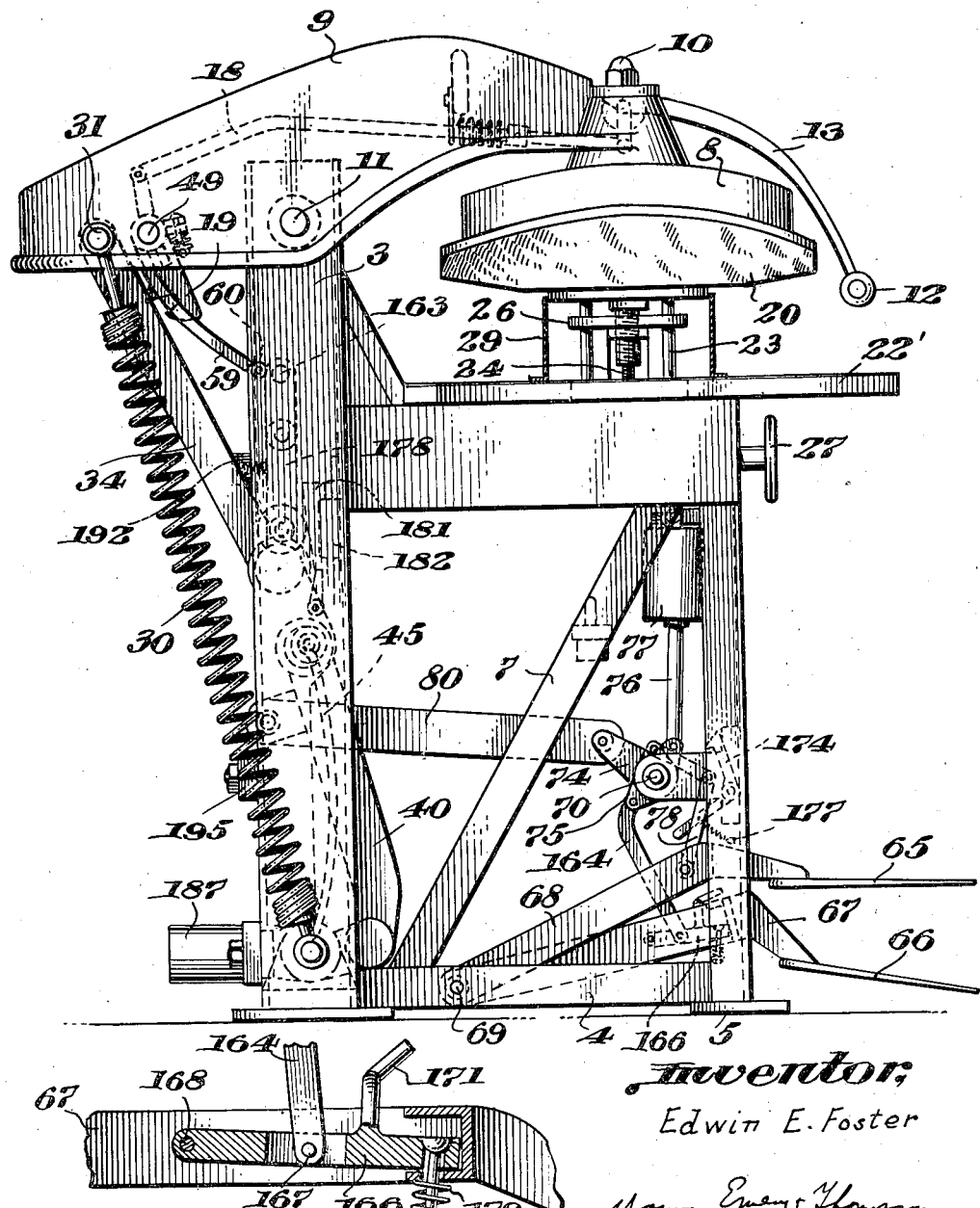

The pressure applying means including the mechanism to effect the pressure of an energy unit from and between the head and bed members comprises a toggle linkage 33 having a preferably square and solid rod 34 pivotally connected at 35, Fig. 6, to the yoke 9 by means of a bearing sleeve. The second link 36 of the toggle is U-shaped and is piovted at 37 to the rod or link 34 at the upper end and at the lower end a forked member 38 is rigidly secured thereto of which each fork member 39 pivots on its respective stub shaft 32, Fig. 4. A U-shaped link 40, Figs. 1 to 3, is pivotally mounted on bolts 41, Fig. 4, secured in the frame members 3 by means of the nuts 42 and the other end of the link 40 has a U-shaped extension in the form of a fork 43 having a pin or rod 44 extending through the ends of the arms thereof. This pin 44 receives one end of a flat blade spring 45, shown in Figs. 8 and 9 in the unbowed position with an eye connection 46 at each end thereof, and the other end of the spring is secured around a pin or rod 47 in the link 36 not far from the pivotal connection 37 of the toggle links. Thus one end 47 of the spring is connected to the toggle linkage and the other end 44 to the frame 3 by means of link 40 which is connected to the frame at one end and receives the end of the spring 45 at the other end. The spring is approximately "diamond" shaped and when placed in the machine it is slightly bowed with a constantly stored energy therein which remains permanently in the spring at all times during the life of the machine. This spring has a constant tension or force directed parallel to the approximate axis of the spring or it may be defined as projecting equal forces constantly in opposite directions in a common plane from the edge or eye ends thereof as indicated by the arrows in Figs. 8 and 9. Also the forces are approximately equal within certain bowed limits of the spring but even with the slightest bow in the spring the maximum forces will be exerted and this equal force will remain the same up to a considerable bow in the spring. The spring can have any other desired shape and configuration but the forces are always projected equally away from each other at the opposite ends of the spring in a common plane from the ends thereof in opposite directions.

In the position of the parts in Fig. 1, which is the press open position, the springs 30 may be completely relaxed or free of any tension tending to pull the yoke 9 to rotate counterclockwise around the pivot 11. To maintain the head 8 in the full open or raised position the yoke is latched by means of the latch 19 mounted on a tube section 48, Fig. 12, rotatably mounted on a shaft 49 secured in the yoke 9. A second sleeve 50 is also rotatably mounted on the shaft 49 and a third sleeve 51, Fig. 12, is likewise rotatably mounted on the shaft 49, all adjacent to each other. The sleeve 48 is provided with a lateral stop 52 which cooperates with a lateral stop 53 secured on the sleeve 50 which latter also has a lever arm 54 thereon and a lateral stop 55. The stop 55 cooperates with a lateral stop 56 mounted on the sleeve 51 through a bolt 57 passing through the stops 55 and 56 with a compression spring 58 on the lower end thereof. The sleeve 51 is also provided with a stop finger or latch 59 secured thereon and which cooperates with a stop pin or roller 60, Fig. 2, mounted on the inside surface of one of the uprights 3. The member 19 latches the head member 8 in the open or raised position, Fig. 1, while the member 59 latches the head member in the closed position but without pressure applied to prevent the head member from raising before the pressure is applied between the head and bed members. The parts as shown in Fig. 12 represent the elements in the press open and the pressure applied positions.

As to the operation of the two latching members in the position of Fig. 1 on the initial pull of the handle 12 the shaft 14, Fig. 5, is rotated to move the rod 18 to the left, Fig. 1, by the lever 17 which moves the arm 54, Fig. 12, to the left to raise the latch 19 by means of sleeve 50, stops 53 and 52 and sleeve 48. The latch 19 releases its hook 61 from a roller 163, Figs. 1 to 4 and 10. This frees the yoke 9 whereby upon a manual force of approximately the weight of the operator's arm or slightly more, on the handle 12, the yoke 9 and head member 8 descend with rapid acceleration due to the weight of the head member and the fact that the springs 30 are initially completely relaxed. Even if the operator merely actuates the handle 12 to release the latch 19 and then the operator's hand is removed entirely from the machine the head member 8 will fall with such acceleration that even though the springs 30 are gradually flexed the head will almost touch the bed member 20 before such springs 30 will bring the head member back with a gradually shorter pendulum motion until the head member comes to rest approximately between the head and bed members as positioned in Fig. 1. Upon the hand however moving the head member in contact with the bed member the latch 59 will contact the stop pin 60, Fig. 2, until ironing pressure is applied when simultaneously the latch 59 is released as will be explained in the following.

In the position of Fig. 1 the latch 59 is under the pin 60 and when the handle 12 is moved down relative to the head member 8, the sleeve 50, Fig. 12, is rotated slightly counterclockwise at the same time flexing the spring 58 due to the stops 55 and 56 being moved relatively away from each other for the reason that the pin 60 prevents the rotation of the sleeve 51 due to the latch 59 abutting against the pin 60. When however the yoke is in its down position, Fig. 2, the latch 59 passes up by the pin 60, due to the tension in the spring 58, to abut endwise against the pin 60 in which position the stops 55 and 56 are again in contact with each other. Upon the application of ironing pressure the latch 59 is automatically released and due to the spring 62, Fig. 3, abutting against a stop lug 63 on the yoke at one end and the abutment 64 on the rod 18 at the other end, the latter is forced to the right, Fig. 6, to move the handle 12 and the latch 59 to their initial positions.

The ironing pressure and release mechanisms are operated by foot pedals 65 and 66 of which pedal 65, Fig. 11, applies the ironing pressure and pedal 66 releases the pressure. The release pedal 66 is secured to a lever 67 which may be termed the release pedal and the lever 68 may be termed the pressure pedal. These pedals rotate on a shaft 69 with suitable spacer sleeves thereon, not shown, and this shaft is mounted in the side angle irons 4. A counter shaft 70, Fig. 11, is provided above the pedals 66, 67 and 65, 68, in angle plates 71, Fig. 5, bolted or riveted to the uprights 2. The countershaft 70 is provided with a plurality of crank arms 72, 73, 74 and 75 each secured to rotate with the shaft 70. The crank arm 72 is connected by a piston rod 76 to a dashpot or air check 77 and the crank arm 73 is connected by links 78 to the pressure pedal 65, 68 at a pivotal connection 79. The crank arms 74 has a connecting lever 80 secured thereto at one end of which the other end is connected to a depending lug 161 by a pivotal connection 162. The crank arm 75 has an actuating rod 164 connected thereto at the upper end at 165 and the lower end of this rod being pivotally connected to an auxiliary lever 166 at 167, Fig. 11a. This auxiliary lever 166 is pivoted at one end to the main pedal lever 67 at 168 and the other end of this lever is provided with a resilient bolt 169 having a spring 170. This spring 170 constantly urges the auxiliary lever 166 to its lower position as shown in Fig. 11a. An upstanding pin or rod 171 is secured to the top surface of the lever 166 and projects, when the pedal 66 is in its raised position, into the path of the lever 172 pivotally mounted at 173 to the frame. This lever 172 has a pawl 174 secured thereon and this pawl is adapted to cooperate with the stop 175 secured to an arm 176, the latter of which is mounted to rotate with the shaft 70. A spring 177 constantly urges the lever 172 and pawl 174 counterclockwise.

The latch 19 in the press open position of Fig. 1 grips a roller 163 mounted at one end on a double lever 178, Figs. 7 and 10, pivoted at 179 to one of the uprights 3 of the frame. The other end of the lever 178 carries a roller 180 which cooperates with and contacts a wedge member 181 also mounted in one of the channel uprights 3. A spring 192 constantly urges the lever 178 counterclockwise around the pivot 179. This wedge member is slidable between side guide plates 182 and on a friction material or insert 183. An arm 184 extends from the lower end of the wedge and this arm is provided with a roller 185 which is adapted to contact a cam 186 on the link 40. This lever 178 together with the wedge 181 operates as an overrunning clutch, the purpose of which will be understood from the operation of the machine.

An air check 187 is mounted on the rear side of the machine to provide a resilient bumper and stop for the return stroke of the link 40 in that the cross member 188, Fig. 7, of the fork 43 abuts against the springs 189 which react against the piston 190 and spring 191. A rubber bumper 193, Fig. 1, is secured to a cross member 194, Fig. 5, to cushion the upward stroke of the link 40, Fig. 3.

The cross bar 195, Figs. 1 to 4, bolted across the uprights 3 acts as a stop member for the movement of the toggle linkage toward the left in case the padding may be removed from the bed member to be renewed and the head member is accidentally brought down which would unavoidably release the energy in the spring 45.

*Operation*

The press according to Figs. 1 to 12 operates as follows.

Assuming the various parts of the machine to be in the positions shown in Fig. 1 and an article or a material has been placed on the bed member 20 to be pressed, the operator grasps the handle 12 and with a slight pull first releases the latch 19 through levers 13, shaft 14, lever 17, rod 18 and arm 54 which will tension the spring 58 and at the same time permit the yoke and head member to descend with considerable acceleration due to the weight of the head member. The machine ultimately reaches the position of Fig. 2 with the yoke and head member locked down by stop finger 59 contacting pin 60. In this position, that is Fig. 2, no ironing pressure is as yet applied through the head and bed members. At this time or just before the head member contacts the bed member the operator steps on the pedal 65 which brings the link 40 up to the position of Fig. 3 through links 78, crank arm 73, shaft 70, crank arm 74 and link 80. The ironing pressure is now applied to the head and bed members since the constantly tensioned spring 45 produces a force against the toggle toward the left, Fig. 3, due to the pressure forces being directed from the ends of the spring as indicated by the arrows in Figs. 8 and 9. In the position of Fig. 3 with pressure applied the shaft 70 is locked against return movement for the spring 45 and link 40 by the latch 174, Fig. 11. The ironing pressure is released by stepping on the release pedal 66 which first forces the latch 174 to the right, Fig. 11, due to the short lever 166, Fig. 11a, rotating counter-clockwise around 167 to force the pin 171 upward to release the latch 174 and shaft 70 so that the pull rod 164 will rotate the shaft 70 counter-clockwise, Fig. 11, to return or lower the spring 45 and link 40 to the position of Fig. 1, whereby the springs 30, which are under tension, will quickly pull the yoke and head member upwardly and throw it to the extreme raised position where the latch 19 locks the yoke by gripping roller 163.

As to the operation of the overrunning clutch it is clear that when pressure is applied between the head and bed members the cam 186, Fig. 7, will contact the roller 185, upon the upward swing of the link 40, which will slide the wedge 181 upwardly so that the lever 178 will rotate slightly counter-clockwise around pivot 179 to force the roller 163 toward the left a slight distance by spring 192. When now the link 40 moves down the wedge 181 is frictionally held against the friction material 183 by the spring 192, lever 178 and roller 180. When now the latch 19 swings into the roller 163, Fig. 1, upon the final upswing of the yoke it moves the lever 178 slightly clockwise so that the yoke will be locked at its extreme raised position due to the wedge 181 being pulled down by gravity or if necessary by a spring, not shown, to contact the roller 180 as far as it moves to the left. Thereby upon each operation of the machine there will be a slight overrun of the roller 163 to stop the yoke at its extreme top travel which may of course vary slightly as for instance due to different thicknesses of material or under or over lubrication. The roller 163 is "overrun" each time so that it is assured that the roller will be in the position to be gripped by the latch which latter adjusts such overrun to the extreme top of the travel of the yoke.

Thus the purpose of the overrunning clutch is to assure the locking of the head member 8 in its extreme upward swing position to prevent its dropping slightly before the latch 19 positively locks the yoke and head member. The cam 186 on link 40 in Fig. 3 forces the wedge 181 upwardly to allow the roller 163 to move to the left, which in Fig. 1 is moved to the right by the latch 19 until the yoke comes to its complete raised position.

The pressing machine shown in Figs. 13 to 19 is particularly adapted for such presses known among other terms as "bantam" machines but it can be built to produce any desired pressure as for example from 500 to 8000 lbs. or more depending upon the strength of the spring and the size of the various parts. The frame of the machine may be made of any desired parts in any suitable configuration such as angle irons of which the extreme base portion 81 is of channel or U-shaped cross-section to which the supporting strips or plates 82 are suitably secured by welding or otherwise. Each plate 82 is provided with end perforations 83, Fig. 17, to bolt the machine to the floor. Right angle bars 84 in the form of uprights, one in each corner, Fig. 17, rigidly support the upper part of the machine on the base portion 81 but it is of course understood that cross tie rods or bars (not shown) and covering plates (not shown) may be provided to conceal the working parts of the machine and thus improve the appearance thereof. The upper part of the frame consists of side plates 85 with a front plate 86 and a rather heavy rear plate 87, all of which are suitably secured to the upright angle irons 84 to form a rigid frame for the press. A top plate 88, Figs. 13 to 15, has a portion 89 projecting upwardly and backwardly so that the materials to be pressed will not reach the working parts of the machine. A projecting table 90 extends from the front of the machine and this table together with the plate 88 and portion 89 are suitably secured to the side and front plates 85 and 86 or the plate 88 and portion 89 may be made integral with the plates 85 and 86.

A buck or bed member 91 is supported by one or more posts 92 threaded in a supporting collar 93 and secured in cross webs 94 and bolted by nut 95. The webs are secured to the plates 85, to rigidly support the bed member 91 on the top plate 88.

The movable head member 96 is supported by bolts 97 to the movable arm or yoke 98 and by means of a spring 99 around each bolt the head member may be adjusted by the manual wheel 100 to adjust the machine to a certain thickness of the pad on the buck. The yoke 98 is of U-shaped cross section and is pivoted in the side plates 85 at 101 by means of stub shafts one in each plate 85, Fig. 16, with a suitable ball bearing 102. This mounting consists of a tubular portion 103 on each side of the arm 98 welded or otherwise rigidly mounted thereon and each tubular portion 103 has two downwardly extending lugs 104 to extend on each side of its respective side plate 85. These lugs are thus rigidly connected to and move with the yoke 98 around the pivot or shafts 101. The yoke 98 supporting the head member is also provided with an operating or actuating handle 105 having two lever arms 106 and 107 pivoted on the shaft 108 in the yoke 98. The lever arm 107 extends back of the shaft 108 by means of a portion 109 and is connected to an operating rod 110 secured to a latch member 120, which will be more fully described.

As shown in Figs. 13 to 15 the yoke 98 has a rear portion 111 which curves considerably relative to the front portion to which the head member 96 is connected. A bearing member 112 on each side of the yoke 98 is interconnected by a shaft 113 to which one end of a leaf spring 114 is connected and on which it rotates through several positions of the actuating parts of the machine. This spring 114 is of course similar to the spring of the machine of Figs. 1 to 12 in that it is approximately "diamond" shaped, it is pre-stressed and is a compression spring in which the forces extend longitudinally of the length of the spring with practically no change in the force thereof upon further or less "bowing" by relative movement of the ends of the spring. The other end of the spring is connected to and pivots around a shaft 115 mounted in the two short arms 116, Figs. 15 and 19, which are rigidly connected to and form a part of a movable link 117. This link is also double armed as shown in Fig. 19 and each arm is pivoted to a bracket or flange 118 at 119. The brackets are suitably secured and mounted on the rear plate 87 and the pivot pins 119 not only have a bearing in the brackets but also in the side plates 85 as shown in Fig. 16.

At the rear end of the yoke 98 there is pivoted the latch member 120 at 121 as well as a counterbalance spring 122. This latch member is provided with a projecting lip portion 123 and a slot 124 and has the rod 110 connected thereto at 125. The latch also has a hook portion which together with the slot is adapted to contact and grip a roller 126 mounted in a lever 127 pivoted at 128 to a downwardly projecting lug 129. This lug is secured to one of the webs 94. The lever 127 is also provided with a second roller 130 and a spring 131, also secured to one of the webs 94, constantly urges the lever 127 counter-clockwise, Figs. 13 to 15. The roller 130 cooperates with a sliding wedge block 132 in frictional contact with a backing layer 133 and guided between two flanges 134. The guide flanges 134 are secured on a plate 135 which may be integral with or secured to the two front uprights 84.

The wedge 132 has an eye portion 136 at its lower end to which one end of a rod 137 is attached, the other end of the rod being guided in an opening in the bell-crank connection 138 adjacent to a stop collar 139. The bell-crank 138 is mounted between two upstanding lugs 140 by means of a pin 141 and secured to the bottom of the base portion 81, the spring 122 being connected to this bell-crank 138.

The press of Figs. 13 to 19 is also equipped with a pair of foot pedals 142 and 143, of which the pressure applying pedal 142 is mounted on a lever 144 pivoted on a shaft 145 by means of a rather long sleeve bearing 146, Fig. 17. The other pedal 143 is connected to a short lever 147 pivoted at 148 to a long lever 149, the latter having a stop member 150 at one end and a connection for an actuating bar 151 at the other end 152. This lever 149 is pivotally mounted in the base portion 81 at 153 also by means of a long bearing 154. The short lever 147 also has an arm 155 with a spring 156, Figs. 13 to 15, between it and the stop 150 and an upstanding latch finger 157 having a hook on its end to cooperate with the lock projection 158 mounted on an upright 84.

The pressure applying pedal lever 144 has a laterally projecting finger or arm 159, Fig. 17, with a roller 160 on its end, the roller contacting the pressure release pedal lever 149.

*Operation*

The machine according to Figs. 13 to 19 operates as follows.

Assuming the parts to be in the position shown in Fig. 13 which is the open press position the operator grasps the handle 105 and with a slight pull operates the latch 120 similar to the operation of the machine according to Figs. 1 to 12. The yoke and head member now fall with rapid acceleration and with a continued slight manual force the head member 96 is brought in contact with the bed member 91 at the same time that the spring 122 is tensioned. This tensioning of the spring 122 tends to somewhat slow down the speed of descent of the head member which results in a noiseless operation of the machine. At the same time or slightly before the head member 96 contacts the bed member the operator steps on the pressure applying pedal 142 which latter through the action of the arm 159 and lever 149 pulls down on the rod 151 to move the link 117 together with the spring 114 to the position shown in Fig. 15 from the position of the parts shown in Fig. 14. The force of the spring 114 is now directed through the head and bed members due to the fact that the spring 114 at one end applies the pressure on the end of the yoke so that this force is directed through the yoke and down between the head and bed members back to the frame. After completion of the ironing step the operator steps on the release pedal 143 which first releases the latch 157 and due to the pivotal connection around pivot 153, the rod 151 forces the link and spring back to the position shown in Fig. 14. In the meantime and during the descent of the head member on the bed member the wedge 132 has been forced upwardly to its position shown in Figs. 14 and 15 in order to adjust the roller 126 to the left so that when the yoke moves the head member back to its open position, the latch will contact the roller to thereby maintain the head member in its extreme open position. The wedge 132 is forced upwardly when the head member 96 descends from the position of Fig. 13 to that of Fig. 14 by means of the spring 122 which gradually rotates the bell crank 138 counterclockwise striking the collar 139 and forcing the rod 137 upwardly.

The latch 120 after engaging the roller 126 moves to the right as the head member moves to its extreme open position, to thereby maintain the head member in said extreme open position. Also at the same time that the release pedal is moved downwardly by the foot of the operator the pressure applying pedal 142 will move back into its original position due to the arm 159 of which the roller 160 contacts the lever 149 to accomplish the return of the pressure applying pedal back to the position shown in Fig. 13.

The machine according to Figs. 20 to 32 is designed to not only press washed articles such as all types of wearing apparel and linen but is also capable of use as a suit, coat, etc. press for cleaning and pressing shops. Also the machine may develop any desired force between the head and bed members depending upon the strength and size of the parts including the spring.

The machine comprises a head member 196 mounted on a yoke 197 pivoted at 198 on the machine frame. This frame includes base plates 199, Fig. 25, by means of which the machine may be bolted to the floor. A channel member 200 is secured to the base plates and a pair of spaced uprights 201 extend vertically from the front base plate. Each upright 201 has a rearwardly directed arm member 202 supporting a table 203, Fig. 30.

The buck or bed member 204 is pivotally mounted at 205 by means of a column 206 and a rectangular tube 207 secured on the plate 208 which latter carries the bed member 204. The pin 205 is rotatably mounted in the side frame members 202. A wedge member 209 is laterally adjustable in a slot 210, Fig. 31, passing through the column 206 as well as slots 211, Fig. 29, in the tube 207. A winged nut 212 is threaded on a spindle 213 the latter being secured to the wedge 209. The nut 212 rotates in the flange 214 depending from and secured to the plate 208. The wedge 209 adjusts the height of the bed member 204 relative to the column 206 which may be necessary due to settling of the padding on the bed member.

The machine is provided with a pair of counterbalance springs 215 connected at the upper end by an eye bolt 216 to the yoke 197 at 217, and at the other end by an eye bolt 218 to the shaft or axle 219, Fig. 25. The foot pedal 220 is pivoted on the shaft 219 by means of a forked lever 221. A release pedal 222 is pivoted at 223 to a lug 224 secured to the frame and is provided with a latch 225 which cooperates with a pin 226 on the lever 221.

The yoke 197 is secured to the head member 196 by any suitable means such as bolts 227 and a handle 228 actuates a pair of lever arms 229 pivoted at 230 to the yoke. One of the arms 229 has an extension 231 which projects downwardly and is pivotally connected at 232 to a pull rod 233 which latter is connected by an elongated eye slot to a latch 234. Springs 235 are connected to the latch 234 and to the pivotal connection 232 to urge the latch clockwise around its pivot 236 and the lever 231, 229 counter-clockwise around its pivot 230 but these rotary movements are of course relatively small. This machine is also provided with an overrunning clutch device similar to the corresponding devices of the other two modifications and this device includes a wedge 237, a pivoted lever 238 and rollers 239 and 240.

The machine is also provided with a permanently stored energy unit in the form of a flat single leaf spring 241 which is tensioned at one end to the frame at 242 and at the other end to the link 243 at 245, the link being shiftable around its end pivot point or pins at 255 in the ends of the yoke members 197, Fig. 23. Suitable stop members 246 are mounted on the yoke and link to limit the movement of the link when these members are adjacent to or in alignment with each other.

The link 243 is shifted from the position of Fig. 20 to Fig. 21 by the yoke 197 but the link and spring 241 are shifted from the position of Fig. 21 to Fig. 22 by the foot pedal 220, 221 by means of a link 247, pivoted arm 248 and link 249, of which arm 248 is pivoted at 250 to the frame. The arm 248 also has an extended portion 251 which acts on and lifts the connecting rod 252 to the wedge 237.

It is also obvious that the head member may be assisted to the closed position by the foot pedal 220 after the latch 234 is disconnected from the roller 239 by the handle 228 or by any other suitable means, not shown.

The end of the yoke members 197 has a plate 253 connected across the top of these members and two ears or lugs 254 depend therefrom in which one end of the respective pivot pins 255, Fig. 23, are mounted. A cam member 256 is secured to one of the yoke members 197 which is adapted to abut against a roller 257 on the lower end of the lever 258. This lever 258 is rigidly connected to the buck support column 206 by keying or pinning these members to the shaft 295 and is provided with a tension spring 259 connected at one end to the frame and the other end to the roller end 257. In the position of Fig. 20 the roller 257 may abut against the frame 201 by the action of the spring 259 and when the parts are in the position of Fig. 21 the cam 256 has contacted and moved the roller 257 a slight distance to the left and therefore the buck or bed member 204 is moved slightly to the right around the pivot pin 205. In Fig. 22 with pressure applied the head member 196 has settled slightly due to the application of the ironing pressure which will move the buck or bed member 204 a slight further distance to the right by the same means.

The table 203 is provided with a pair of depending ears or lugs 260 in which the pivot pins 198 are mounted at one end with the other ends of the pins in the frame members 202. The pivot 242 for the spring 241 is secured in two upright flanges 263 mounted on an angle iron 264 forming a part of the frame of the machine. Two limit stops in the form of pins 268, Figs. 20 to 22, are provided in the yoke 197 to act as limits for the lever 231.

Operation

The machine of Figs. 20 to 32 operates as follows:

Assuming that the parts are in the position shown in Fig. 20 and a material to be ironed is spread out on the buck or bed member 204, the spring 241 in this press open position exerts its force against the frame at 242 at one end and the other end against the link 243 tensioned against the pins 255, Fig. 23, and yoke 197 to the pins 198 and the frame 202. In Fig. 20 the link 243 is shown in dotted lines behind the side frame member 202. The handle 228 is pulled down a short distance relative to the head member 196 which releases the latch 234 from the roller 239. The weight of the head member and yoke now fall with rapid acceleration which also builds up a certain amount of energy in the counter-balance springs 215 so that with a small amount of energy added by the operator's hand the counter-balance springs become fully loaded by the time the head member touches the bed member. With thus a slight pull on the handle 228 and a slight pressure on the pedal 220, the link 243 and the spring 241 are tripped and moved into the position of Fig. 22 from the position of Fig. 21 to thus apply an ironing pressure between the head and bed members. The end force of the spring 241 is thus directed against the pivot points 242 and 245 which induces a pull or tension in the link 243, the point 242 being fixed to the frame 201, to pull the yoke through a force directed clockwise around the pivot 198, Fig. 22, which results in a force being directed down from the head member to the bed member and thence to the frame.

Just before the head member reaches the bed member, that is, in the dotted line position 261, Fig. 20, the cam 256 contacts the roller 257 to move the lever 258 slightly to the left which is moved slightly further when pressure is applied as shown in Fig. 22. This permits the lower surface of the head member to contact the upper surface of bed member evenly at all points throughout the breadth of these members and to preserve this relationship throughout the pressure application.

In the position of Fig. 22 the rod 252 has adjusted the wedge 237 upwardly to adjust the roller 239 so that upon the return of the yoke and head member the latter will come to rest at its extreme top or open position as fully described in connection with the preceding constructions.

The press is released or opened by depressing the release pedal 222, whereby the link 243 together with the spring 241 will move upwardly around pivot points 242 and 255 in view of the fact that these points are slightly out of coincidence so that in the position of Fig. 21 the counterbalance springs 215 will open the press with rapid acceleration and the yoke is latched at its extreme top or open position.

It is of course understood that in the various machines which have been described that any moving parts and bearings may if desired be provided with ball or roller bearings and this refers likewise to all spring connections shown and described.

Also it is of course obvious that the various machines shown and described may be modified within the scope of the appended claims. It is also obvious that all the parts need not be used conjointly since they can be used individually or in combination with the various devices and details shown in the several modifications.

I claim as my invention:

1. A pressing machine comprising relatively movable head and bed members, a frame on which the bed member is mounted and the head member is pivotally mounted, a link member pivotally mounted at one end on the head member, a single blade spring in the form of a leaf mounted with a slight bow throughout its length in constant tension to direct its force constantly in an approximately parallel axis to the length of the spring, said spring being pivotally mounted at one end on the frame and the other end on the other end of the link member, and means for shifting the link and spring to apply or remove the pressure force of the spring relative to the head and bed members.

2. A pressing machine comprising relatively movable head and bed members, a frame on which the bed member is mounted and the head member is pivotally mounted, a link member pivotally mounted at one end on the head member, a single blade spring in the form of a leaf mounted with a slight bow throughout its length in constant tension to direct its force constantly in an approximately parallel axis to the length of the spring, said spring being pivotally mounted at one end on the frame and the other end on the other end of the link member, and means for shifting the link and spring to apply or remove the pressure force of the spring relative to the head and bed members, said means including a foot pedal pivotally mounted to the frame and connected to the link member to shift the link and spring as a unit.

3. In a pressing machine, a frame, a buck mounted on said frame, a head, means to pivotally support each head and to move it into and away from pressing engagement with said buck and comprising a member pivoted to the frame and force transmitting means interposed between said member and said head, an energy storing unit consisting of a rigid link element and a single blade spring element in the form of a leaf having a slight bow throughout its length in constant tension to direct its force constantly along an axis parallel to the length of the spring and being pivoted to said link element, one of said elements being connected at its opposite end to said frame and the other of said elements being connected at its opposite end to said pivoted member, operator controlled means to selectively move said unit through a dead center position to one position in which it resiliently urges said head against said buck or to another position in which the head is free to move from said buck, and means to normally bias said head to a position spaced from said buck.

4. In a pressing machine, a frame, a buck mounted on said frame, a head, means to pivotally support said head and to move it into and away from pressing engagement with said buck and comprising a member pivoted to the frame and force transmitting means interposed between said member and said head, an energy storing unit consisting of a rigid link element and a single blade spring element in the form of a leaf having a slight bow throughout its length in constant tension to direct its force constantly along an axis parallel to the length of the spring and being pivoted to said link element, the rigid link element being connected at its opposite end to said frame and the spring element being connected at its opposite end to the pivoted member, operator controlled means to selectively move said unit through a dead center position to one position in which it resiliently urges said head against said buck or to another position in which the head is free to move from said buck, and means to normally bias said head to a position spaced from said buck.

5. A pressing machine comprising relatively movable head and bed members, a frame on which the bed member is mounted and the head member is pivotally mounted, a pair of links pivotally connected to each other with one end of the pair pivotally connected to the head member and the other end pivotally connected to the frame, a link member pivotally connected at one end to the frame, a single blade spring in the form of a leaf mounted with a slight bow throughout its length in constant tension to direct its force constantly in an approximately parallel axis to the length of the spring, said spring being pivotally mounted at one end to the link member and the other end to the pair of links, and means for shifting the said link member and the spring to apply or remove the pressure force of the spring relative to the head and bed members.

6. A pressing machine comprising relatively movable head and bed members, a frame on which the bed member is mounted and the head member is pivotally mounted, a link member pivotally mounted at one end on the frame, a single blade spring in the form of a leaf mounted with a slight bow throughout its length in constant tension to direct its force constantly in an approximately parallel axis to the length of the spring, said spring being mounted at one end on the head member and the other end on the other end of the link member, and means for shifting the link and spring to apply or remove the pressure force of the spring relative to the head and bed members, said head member being pivotally mounted on lugs secured to the head member.

EDWIN E. FOSTER.

REFERENCES CITED

The following references are of record in the file of this patent:

UNITED STATES PATENTS

| Number | Name | Date |
|---|---|---|
| 823,891 | Nishimoto | June 19, 1906 |
| 1,215,665 | Landis | Feb. 12, 1917 |
| 1,330,308 | Disheroon | Feb. 10, 1920 |
| 1,416,829 | Hoting | May 23, 1922 |
| 1,520,482 | Shore | Dec. 23, 1924 |
| 1,534,533 | Lutman | Apr. 21, 1925 |
| 1,667,831 | Yanchenko | May 1, 1928 |
| 1,678,464 | Diebold | July 24, 1928 |
| 1,680,891 | Ledbetter | Aug. 14, 1928 |
| 1,744,086 | Troisi | Jan. 21, 1930 |
| 1,791,821 | Locke | Feb. 10, 1931 |
| 1,821,670 | Sargent | Sept. 1, 1931 |
| 1,828,452 | Westling | Oct. 20, 1931 |
| 1,900,720 | Lindeman | Mar. 7, 1933 |
| 1,986,099 | Beede | Jan. 1, 1935 |
| 2,055,250 | Colclough | Sept. 22, 1936 |
| 2,089,586 | Strobridge | Aug. 10, 1937 |
| 2,096,151 | Watt | Oct. 19, 1937 |
| 2,097,746 | Strobridge | Nov. 2, 1937 |
| 2,136,927 | Schaum | Nov. 15, 1938 |
| 2,213,689 | Bush | Sept. 3, 1940 |
| 2,231,897 | Foster | Feb. 18, 1941 |
| 2,281,568 | Foster | May 5, 1942 |

FOREIGN PATENTS

| Number | Country | Date |
|---|---|---|
| 629,459 | France | Nov. 10, 1927 |
| 654,195 | France | Nov. 28, 1928 |
| 132,014 | Switzerland | Mar. 31, 1939 |